Aug. 13, 1963 F. M. DEMER 3,100,834

MAGNETIC DATA PROCESSING

Filed June 30, 1959 3 Sheets-Sheet 1

INVENTORS
Frederick M. Demer &
Martin J. Kelly

BY Melvin P. Williams
AGENT

INVENTORS
Frederick M. Demer &
Martin J. Kelly
BY Melvin P. Williams
AGENT

Aug. 13, 1963 F. M. DEMER 3,100,834
MAGNETIC DATA PROCESSING
Filed June 30, 1959 3 Sheets-Sheet 3
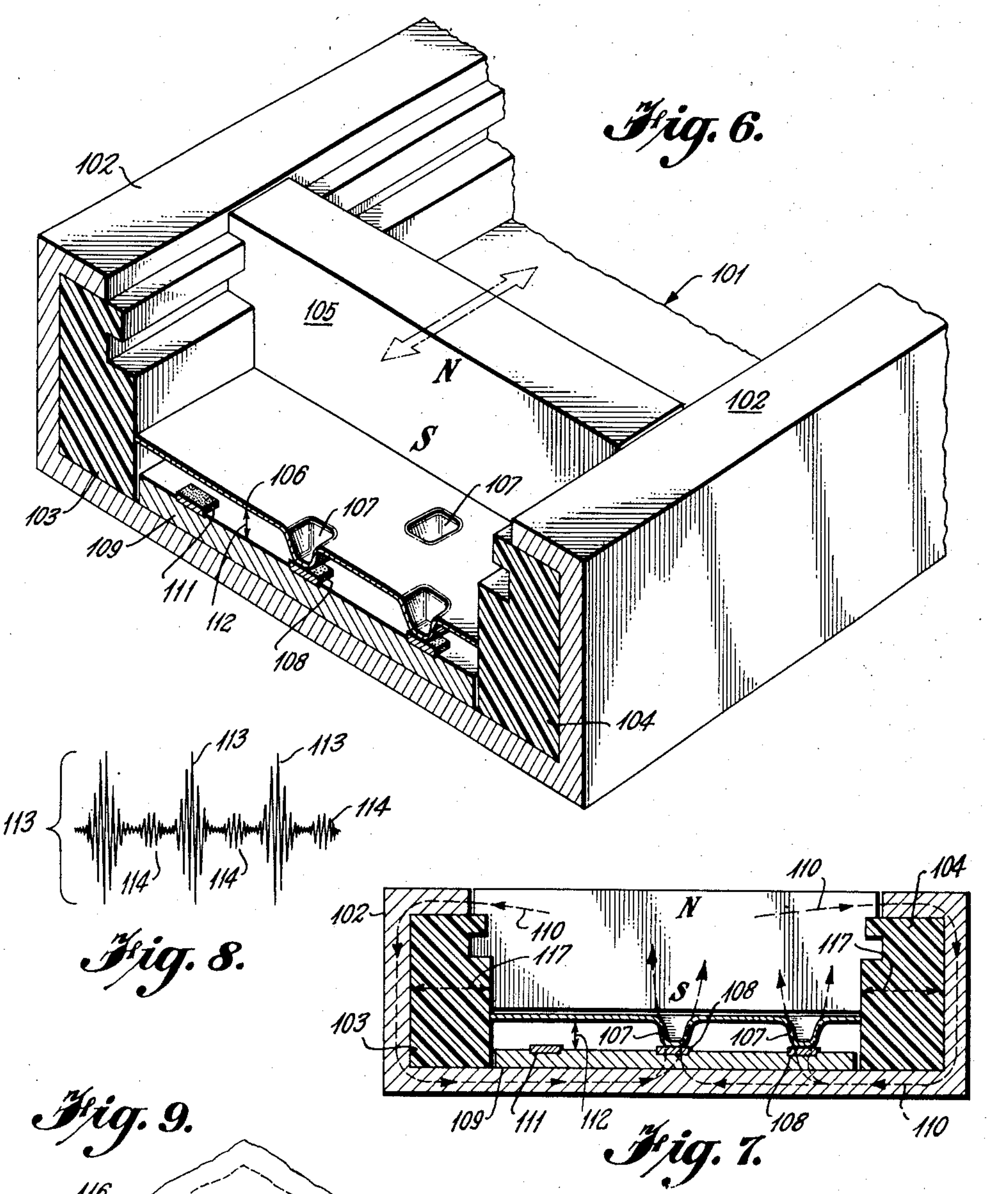
Fig. 6. Fig. 8. Fig. 7. Fig. 9.
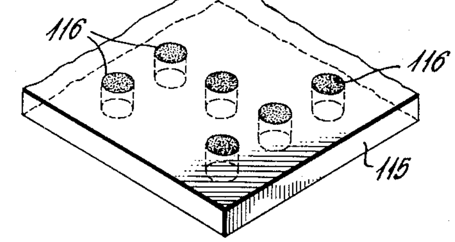
INVENTORS
Frederick M. Demer &
Martin J. Kelly
BY Melvin P. Williams
AGENT United States Patent Office 3,100,834

Patented Aug. 13, 1963

3,100,834

MAGNETIC DATA PROCESSING

Frederick M. Demer, Johnson City, and Martin J. Kelly, Endwell, N.Y., assignors to International Business Machines Corporation, New York, N.Y., a corporation of New York Filed June 30, 1959, Ser. No. 823,903
12 Claims. (Cl. 235—61.12)

This invention relates to data processing, and more particularly to a method of magnetic data processing and a magnetic unit record card therefor.

In the data processing art, it has long been the practice to provide basic unit record cards of a type which are punched with holes in positions which are indicative of the value stored therein. With the advent of high speed computers, the use of record cards as input and output media have become a limiting burden on the speed of computer operations. Therefore, many computer applications use high speed magnetic tape as the input and output medium. Since machines now handle more data in a given time, the limited capacity of punched cards also gave way to the tapes, which store many times as much. However, an elongated magnetic tape comprises many records which appear in the order in which they are recorded; these records cannot be selected at random and moved about in different orders on the tape, nor can they easily be moved between different tapes. Many applications still require use of a unit record card which is discrete and complete in itself.

The punched hole record cards are not only slower than magnetic tapes, but they have other disadvantages; for instance, the use of air pressure to grip the cards for handling is impossible because of leakage through the punched holes; the cards cannot be bent at too great an angle since the edges of the punched holes project from the surface of the card and subject the card to tearing and other damage. After being sensed by brushes a large number of times, the record card has to be reproduced because of wear. Not only does the card have to be fed at relatively slow speed, as compared with magnetic tape, but it also must be fed in step fashion for punching, it being essential that the card stops at each punching station before the card is punched. Therefore, it can be seen that a magnetic unit record will preserve many advantages of the commonly used punched hole record, while gaining some of the advantages of using magnetic tape.

A magnetic unit record card of the type called for in the above discussion is disclosed in U.S. Patent 2,254,931, Control Record for Accounting Machines, issued to J. W. Bryce on September 2, 1941. Among the reasons why the Bryce record card has not received wide use are: First, this record is made up of paper laminations which greatly increases the cost and decreases the flexibility of the record, and the decreased flexibility in turn hampers card handling in the data processing machines. Second, the slower feeding speeds of record cards gives too low a rate of change of flux with respect to time for reliable data sensing. Third, the data processing card industry is now established with relatively localized plants which cut the cards from long continuous stock and print the cards with the individual card-user's information, and therefore the transformation from presently used punched cards to a card of the type disclosed by Bryce would result in a severe curtailment of service to card-users, or would require almost a complete duplication of card-preparation plants all over the country. The use of magnetic record cards heretofore has had an additional disadvantage in comparison with punched-hole record cards: it is frequently desirable to take blank cards, or cards which have a certain amount of standard information printed or recorded thereon, and use the cards to report from remote field operations, entering data by hand at the field stations. It is a relatively simple matter for a hole to be punched in a card manually; furthermore, the registration of punched holes at precise locations has been achieved with relatively simple equipment; however, it has heretofore been difficult to get exactly located spots recorded with sufficient quality to provide the high standard of unit record required for reliable data processing. It has also been difficult, if not impossible, to provide for the magnetic recording of discrete spots as a manual, or substantially manual operation at remote field stations.

Wherefore, it is an object of our invention to provide an improved magnetic unit record card.

Among other objects of our invention are the following:

To provide a record card of standard dimensions with increased data-carrying capacity.

To provide a magnetic record card having the flexibility and ease of manufacture which obtains in the presently used punched hole record cards.

To provide a magnetic unit record which can be manufactured, or processed, in existing card plant facilities.

To provide a magnetic unit record comprising ordinary card stock of the kind now in use.

To provide a magnetic unit record having a high magnetic sensitivity at card-feeding speeds.

To provide a magnetic unit record card having high sensitivity without regard to the direction of the feed of the unit record.

To provide a high quality, low cost record having properties which permit the precision entrance of data therein at remote field stations in a non-precision operation.

To provide a complete record card comprising a full set of data patterns precisely manifested on discrete areas thereof.

It is an object of our invention to provide a method of data processing in which substantial magnetic machinery need not be used for entering data onto the card.

Among further objects of our invention are the following:

To provide a method of data processing using magnetic record cards which faciliates the recording of data on the unit record in manual (or substantially manual) operations.

To provide a system of data processing capable of high speed, precise performance and yet adapted to low cost manual entrance of data therein.

To provide a data processing method in which magnetic record cards can have data selectively manifested therein at remote field stations by manual operations, without expensive machinery.

Our invention contemplates the printing of discrete magnetizable areas on cards of ordinary card stock; the printing being done in the ordinary process of printing the card-user's information on the card stock. The invention also contemplates the method of data processing comprising the preparation of a unit record card with discrete magnetic spots printed thereon, the recording of a magnetic flux on said record card as the last step in the ordinary preparation of the card for the card-user, the erasure of unwanted magnetism on selected spots on the card at remote stations, and the reading of the remaining magnetized areas at central computation stations.

This invention also contemplates the recording of flux in response to alternating current as one step in the printing operation, and the selective erasing of unwanted magnetization at remote stations in response to unilateral magnetic force. Our invention additionally comprises the recording of flux on discrete magnetic areas in response to alternating currents, the minima and maxima of said alternations being applied diagonally across the discrete spots with respect to the normal axes thereof.

The advantages of this method of data processing include the ability to have precise data recording and yet maintain the possibility of manifesting data in the card at remote stations by manual operation. The diagonal recording of A.C. flux patterns provides a greater sensitivity for the size of the spot than would recording normally (or perpendicularly) to the axis of the spot, and the A.C. recording provides much greater sensitivity in that it increases the rate of change of flux with respect to time for any given speed of card motion beneath a sensing head. The increased sensitivity permits putting discrete magnetizable areas on ordinary card stock during a normal printing operation without losing the high quality of performance required in data processing. This type of card also facilitates transition between punched hole record cards and magnetic record cards, or the coexistance of both systems. All of the advantages attendant to magnetic records are made available by providing a useful, workable magnetic record of commercial quality.

The foregoing and other objects, features and advantages of our inventions will be apparent from the following more particular description of preferred embodiments thereof, as illustrated in the accompanying drawings.

In the drawings:

FIG. 1 includes a fragmentary isometric view of one embodiment of a magnetic record card, and an isometric representation of the flux density which may be recorded on one of the spots of said magnetic record card.

FIG. 6 is a partially sectioned isometric view of a device for selectively erasing magnetized areas not used in the data to be recorded on the record card.

FIG. 7 is an exaggerated section of the device in FIG. 6, showing the path of magnetic flux in the erasing process.

FIG. 8 is a diagram showing the wave shape of the signal that results from sensing spots on the record of FIG. 1 after selective erasing.

FIG. 9 is a fragmentary isometric view of an alternative form of the selective erasing shield shown in FIG. 6.

Figure 1:
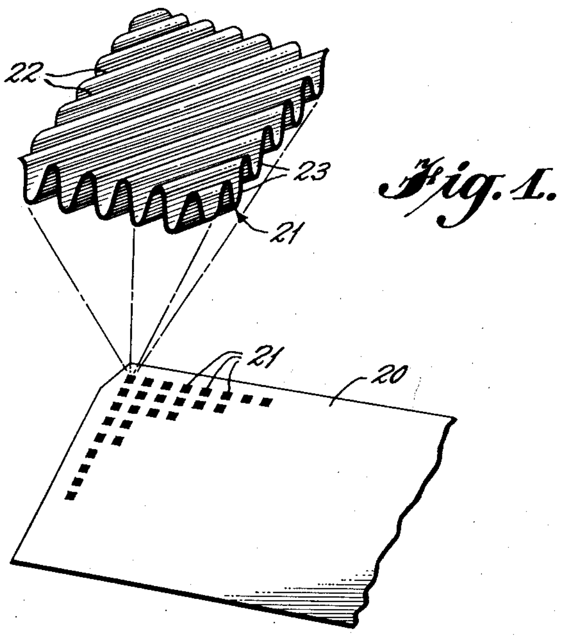

Referring to FIG. 1, one embodiment of the invention comprises a record card 20 consisting of ordinary record card stock of the type used in the punched-hole record cards currently in use. The record card 20 has a plurality of discrete spots 21 thereon, which may be arranged, for instance, thirty spots across the short dimension of the card and seventy spots along the long dimension of the card. Each spot may be about 0.05 inch square and located at center-to-center distance of 0.10 inch. The size and spacing of the magnetic spots is a matter of preference, and may be varied to suit design expediency; the thirty by seventy arrangement provides for 2100 good sized spots which are sufficiently isolated from each other for good signal response. Above the record card in FIG. 1 is shown an expanded representation of the intensity of the magnetic flux recorded on the spot in response to alternating current, the maxima 22 and minima 23 of which are oriented diagonally with respect to the edges of the spot 21.

Figure 2:
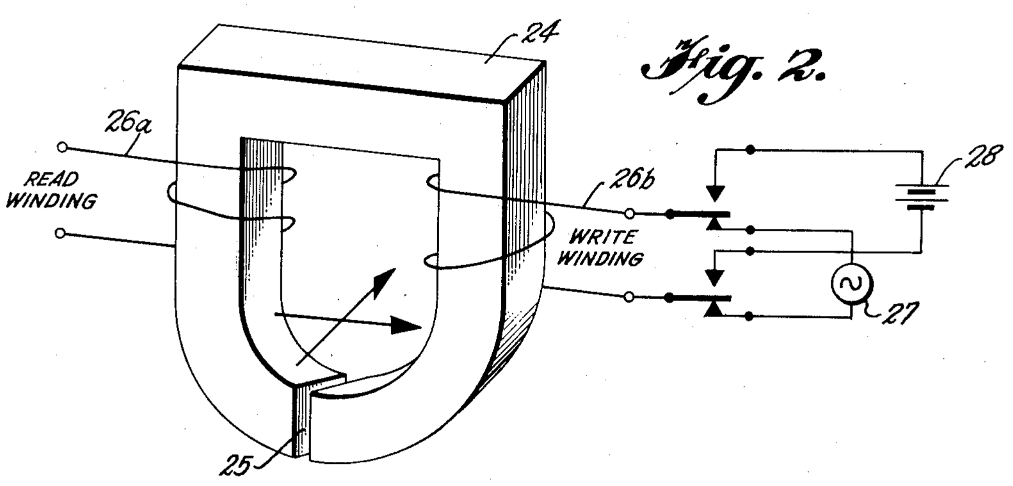
FIG. 2 is a schematic view showing a magnetic head having a read-winding, a write-winding, and a diagonal gap.

FIG. 2 shows the core 24 of a magnetic read-write head which has a recording gap 25 cut therein diagonally with respect to the sides of the core. The core 24 may be any suitable known type, preferably built up of laminations as is well known in the art. The core 24 is fitted with a read-winding 26a and a write-winding 26b; the write-winding may be used alternatively to record in response to alternating current from an A.C. source 27, or to erase in response to current from a D.C. source 28.

The card shown in FIG. 1 can be moved parallel to either its long or short dimension, and the diagonally recorded magnetic flux will cross the recording gap 25 perpendicular to the maxima 22 and minima 23 in either case.

Figure 3:
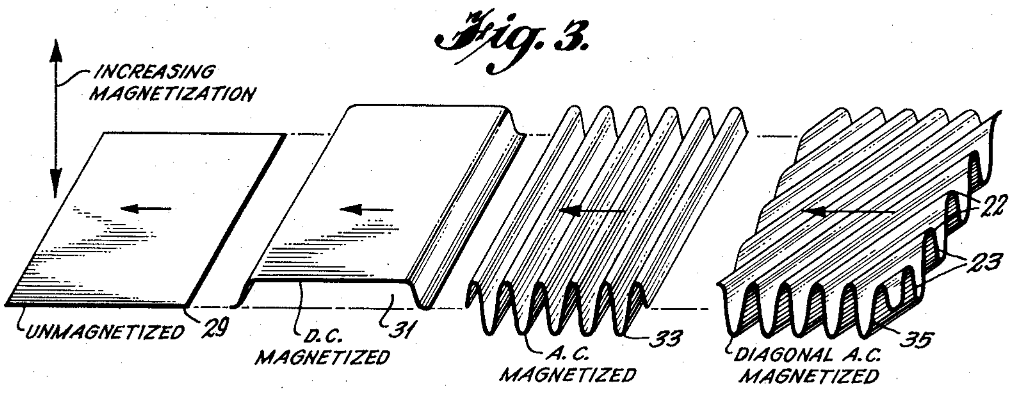
FIG. 3 is a diagram showing the possible patterns of magnetization on the discrete magnetizable spots of the record card in FIG. 1.
Figure 4:
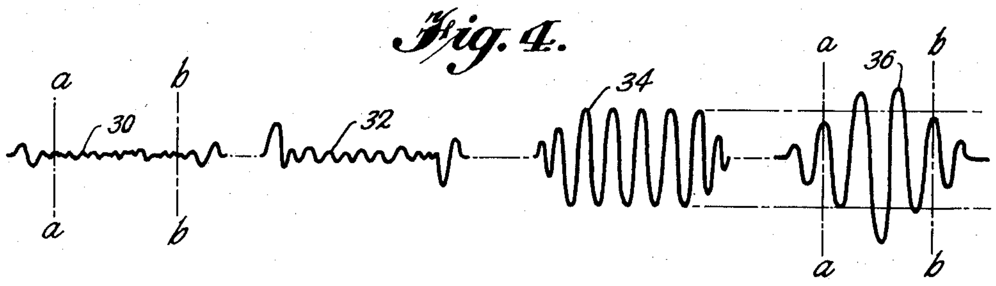
FIG. 4 is a wave diagram showing the signals resulting from sensing corresponding spots magnetized as in FIG. 3.

FIG. 3 represents several possible magnetic conditions of the spots 21 on the record 20 shown in FIG. 1. FIG. 4 shows the wave forms resulting from sensing the spots recorded in a manner corresponding to FIG. 3. At the left of FIG. 3 is shown an unmagnetized spot 29; there is a change of reluctance in the gap at the time the unmagnetized spot 29 passes beneath it due to the magnetic ink which comprises the spot. At the left of FIG. 4 is shown an approximation of the wave form that results when the unmagnetized spot 29 is sensed. This wave form 30 is essentially a noise signal and may vary according to the variation in ink density, prior condition of the spot, and noise pulses in the read-winding 26a of the read-write 24. The second illustration of FIG. 3 shows a spot 31 which has been unilaterally magnetized in response to direct current. The wave shape resulting from sensing the D.C. magnetized spot is shown in wave 32 of FIG. 4. It should be noticed that since the current induced in the winding is a result of the rate of change of flux with respect to time, only the leading and trailing edges of the unilaterally magnetized spot 31 have any significance electrically. Between the leading and trailing edges, the D.C. magnetized spot 31 is at a constant flux level, and there is no rate of change of flux with respect to time; therefore, the central portion of the wave 32 comprises only a noise signal, as in the wave 30 of the unmagnetized spot 29. A spot 33 which is magnetized in response to alternating current will provide a signal throughout its dimension, as shown by the wave 34 in FIG. 4. Wave 34 does not reach full magnitude until several oscillations have been sensed because of the inductive inertia of the read-winding 26a. However, after a suitable length of time, the maxima of the resulting wave 34 are essentially constant until the last oscillation of magnetism in the flux pattern 33 is sensed, after which the oscillations in the winding 26a die out. The increased signal in the wave 34 compared to wave 32 is due to the fact that the magnetization is changing constantly as the spot is fed beneath the gap 25 in the direction of the arrow, and there is, therefore, a continuing rate of change of flux with respect to time. At the right of FIG. 3 is shown an illustration 35 of flux impressed on a spot 21 in response to alternating current by means of a gap which is oriented diagonally with respect to the edges of the spot; the maxima 22 and minima 23 are shown to be oriented diagonally. The wave shape 36 resulting from sensing the magnetic pattern 35 as the spot moves in the direction of the arrow is shown at the extreme right of FIG. 4. The diagonal of a square magnetic spot 21 is approximately 1.4 times as long as is the normal dimensions of the spot. Therefore, the maxima 22 and minima 23 of the pattern 35 are 1.4 times as long in the center thereof than are the maxima and minima in the magnetization pattern 33. Therefore, when the diagonal of the spot is passing beneath the magnetic gap 25, the rate of change of flux with respect to time is 1.4 times as great as it is when sensing the magnetized pattern 33, which is recorded normally. This is illustrated by wave 36, the maximum intensities of which are 1.4 times as great as the wave 34.

Figure 5:
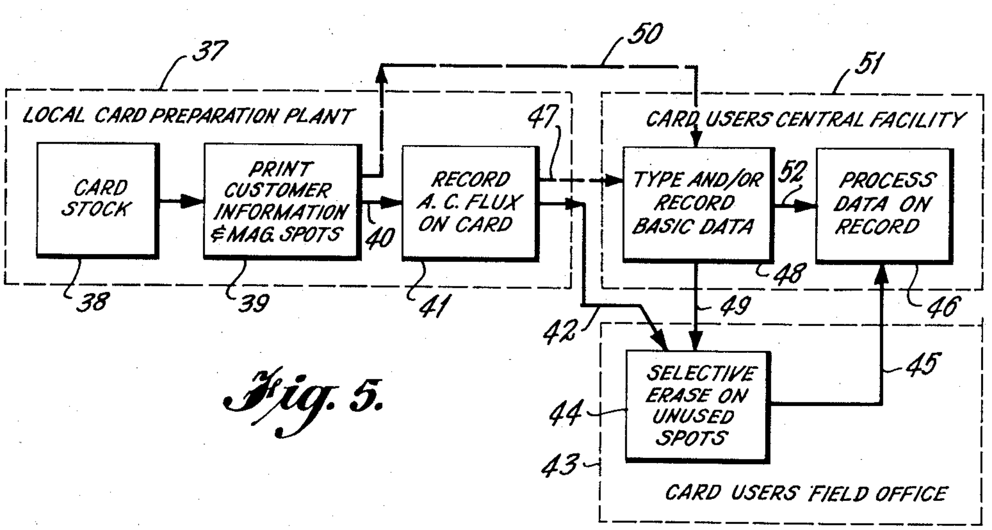
FIG. 5 is a block diagram representation of a method of data processing using the disclosed magnetic record.

In FIG. 5 is shown a block illustration of a system of data processing in which the selective erasure of prerecorded magnetic patterns may be used as a means of entering data. At the left of FIG. 5 is shown a dotted block 37, which represents the card manufacturer's local card preparation plant. In this plant, ordinary card stock 38 is fed into a high speed printing press 39, where the information required by the card using customer is printed on the stock, and the stock is cut into discrete record cards. We have found that it is a simple matter to print discrete spots on the backs of these cards using any well-known magnetic ink.

After the card stock is printed both with the customer information and with the discrete magnetic spots, the card may follow either of two routes, for example. The first route 40 is a route primarily being contemplated in this invention; this would send the card through one further station 41 in the local card preparation plant where each of the discrete magnetic spots would have a pattern of magnetic flux recorded therein in response to alternating current applied to a recording head 24 having a diagonal gap 25, as shown in FIG. 2. As the card leaves the card preparation plant after going through the A.C. flux recording station 41, it comprises a complete record of discrete magnetized spots, which spots will ultimately represent data. The card can again follow one of two routes, the route 42 sending the card directly to a card-user's field office shown by the dotted block 43 where the card may have the negative of information which it is desired to impress on the card erased therefrom as hereinafter described. The selective erasing of unused spots 44 can be done very simply without a great deal of precision, and leave the card with precisely recorded magnetic patterns in select spots representing data in the same manner as a very precise initial recording of selected discrete spots. After data is entered on the card by selectively erasing unused spots, the card can follow the route 45 to the card-user's central facility as shown by the dotted line 51, wherein the card can be placed into equipment 46 to process the data on the record for any well-known purpose. The alternate routes out of the local card preparation plant 37 include sending an unrecorded card having magnetic spots printed thereon over the route 50 into the card-user's central facility 51 where the card could have information typed or printed thereon, and/or could have basic data initially recorded in selected discrete spots thereof. This initial recording of discrete spots might also include recording entire areas of discrete spots on the card so that it may then follow the route 49 to the card-user's field office 43 for selective erasure of spots in these completely recorded areas. This allows recording information available only at the central office, and then recording information only available at the field office, using methods which are best suited to the respective offices. The card again can follow the route 45 to have the data thereon processed. Alternatively, a record card which is not prerecorded may follow the route 50 to have only selective information initially recorded therein and then be sent over the route 52 to machinery 46 which would process the data on the record. The great flexibility of our magnetic record and method also permits sending a record card which is recorded with A.C. flux over the route 47 where the records could be sent to machinery 48 in which it would have information typed or printed thereon and could be selectively erased to record basic central information therein. The card could then again follow either the route 52 for processing or the route 49 to have additional information entered therein at the card-user's field office 43. It can be seen from the diagram in FIG. 5 that this record card permits a system of preparation which allows the card user the maximum flexibility in entering data on the record card. It should be remembered that in all of the machine operations which may be performed in the stations 46 and 48 within the card-user's central facility, all of the aforementioned advantages attendant magnetic records will obtain; this means that even those operations which are comparable to ones now performed on punched records can be performed at greatly increased speeds, without wear on the record card, etc.

FIGS. 6–9 show a selective erasing device adapted for use in the selective erasing described above, as disclosed in copending application Serial No. 824,086, Magnetic Data Transferring Device, filed by Alfred Cutaia, F. M. Demer and M. J. Kelly on even date herewith.

In FIG. 6, a holding device 101, consisting of an outside frame member 102 of magnetic material of any well-known type and inner sections 103, 104 of non-magnetic material, slidably restrains a magnet 105. The magnet is free to slide back and forth over a relatively thin embossed shield 106, which is also made of a magnetically conductive material. The embossed shield has dimples (or protrusions) 107 selectively embossed therein so as to correspond in position to discrete areas 108, 111 printed with magnetic ink on a record card 109. The operation of the device is more easily described with reference to FIG. 7. Each of the magnetic spots 108 printed on the card 109 has been subjected to a magnetic field in response to alternating current. The object is to erase the A.C. flux pattern and to substitute therefor a unilateral flux pattern in response to the magnetic force of the magnet 105. According to conventional notation, the flux lines 110 are conducted by the magnetic frame 102 over to the side, down, and along the bottom of the frame 102 adjacent to the record card 109. The dimples 107 embossed in the shield 106 provide magnetically conductive paths for the lines of flux 110; the lines of flux, therefore, will pass from the bottom of the magnetic frame 102, through the magnetic spots 108 in the card 109, and be carried by the dimples 107 back to the south pole of the magnet 105. Any of the magnetic spots 111 which do not correspond to a dimple 107 embossed in the shield, will not have any of the flux 110 pass therethrough because of the air gap 112 between the unembossed portions of the shield 106 and the magnetic spot 111. FIG. 8 shows the wave form that results from sensing a row of magnetic spots 108 having alternating flux patterns recorded therein, alternate ones of which have had the magnetic pattern erased as above described. The signal oscillations 113 are shown to be approximately six times as large as the noise fluctuations 114. This is a good signal to noise ratio for data processing, in which only the presence or absence of a bit of information need be sensed. The signal to noise ratio can further be increased by using only the central portions of the wave resulting from sensing the spots. Since the spot is erased with vertical flux in FIG. 7, and the card is moved in a horizontal plane when sensed the erased spot will give the same signal 30 as the unmagnetized spot 29, shown in FIGS. 3 and 4. Therefore, cutting off the leading and trailing oscillations, shown in FIG. 4 by the lines *a—a* and *b—b*, respectively, will reduce the noise signal of erased spots to a minimum, which will result in a signal to noise ratio of at least ten to one.

In FIG. 9 is shown an alternative embodiment of the shield 106, wherein a non-magnetic plate 115 is fitted with magnetic plugs (or conductors) 116 which extend between the surfaces thereof; the plugs 116 correspond to the dimples 107. The depth of the dimples 107 and the thickness of the plate 115 must be such as will provide a sufficiently large ratio of permeability of the path through the dimples 107 or plugs 116 so that of the path through the air gap 112 or plate 115, respectively, so as to guide substantially all of the flux 110 through the selected ones of the spots 108. The thickness 117 of the non-magnetic inner sections 103, 104 should be large enough so that very little flux 110 will tend to leak through them.

From the above description, it will be apparent that this procedure of manifesting data in the record card is somewhat of a reversal from the usual method. That is, instead of manifesting in the card (in the form of punched holes or magnetic spots) that data which is desired for record, in the method of our invention, the card is initially prepared with a complete area or field of discrete magnetic spots, and then those discrete spots corresponding to data bits not included in the desired data are erased from the card leaving intact, and in perfect, discrete form, manifestations of the data that are desired for record.

In summation, in order to increase the sensitivity (or signal to noise ratio obtainable), we have provided for increased rate of change of flux with respect to time by recording magnetic flux in discrete magnetizable areas in response to alternating current; we have also provided for recording an alternating flux pattern diagonally across a discrete spot so as to increase the maximum rate of change of flux in the center of the spot; we have provided not only for D.C. or unilateral magnetization for erasure, but have also provided unilateral erasing-magnetization in which the lines of flux in the spot are perpendicular to the primary planes of the record card and therefore perpendicular to the plane of card motion regardless of the direction in which it is fed. This increase in sensitivity permits the use of spots printed with magnetic ink, which printing can be effected at high speeds and with relatively little quality control; because of the inherently good sensitivity possibilities, a super-quality magnetic medium is not required. The wave shape shown in FIG. 8 is nearly an exact duplication of actual wave shapes obtained with simple equipment, using a record card of the type described (taken from the regular stock of cards in an operating card preparation plant), the card was printed in exactly the same manner that information is printed for card-users, and the density of the ink was reduced to the minimum allowed in present legible card printing. This means that a record card which practices our invention and is used in the method we disclose can be made according to the minimum standards currently being practiced in the preparation of punched hole record cards and still provide a perfectly adequate, sensitive record card of good resolution.

While the invention has been particularly shown and described with reference to preferred embodiments thereof, it will be understood by those skilled in the art that various changes in form and details may be made therein without departing from the spirit and scope of our invention.

We claim:

1. The method of making a statistical record card which comprises preparing on the surface of a unit of card stock a matrix of sensible discrete spots, covering said unit with a master record having means to mask selected ones of said spots in accordance with a data-representing code pattern, and exposing said unit through said master record to a distributed field of force capable of rendering the unmasked spots non-sensible.

2. The method of making a statistical record card which comprises preparing on the surface of a unit of card stock a matrix of magnetically sensible discrete spots, covering said unit with a master record having means to mask selected ones of said spots in accordance with a data-representing code pattern, and exposing said unit through said master record to a distributed field of magnetic force capable of rendering the unmasked spots non-sensible.

3. The method of making a statistical record card which comprises preparing on the surface of a unit of card stock a matrix of sensible discrete spots each spot of alternating magnetic intensity, covering said unit with a master record having means to magnetically mask selected ones of said spots in accordance with a data-representing code pattern, and exposing said unit through said master record to a distributed field of unilateral magnetic force capable of rendering the unmasked spots non-sensible.

4. The method of making a statistical record card which comprises preparing on the surface of a unit of card stock a matrix of sensible discrete spots having a magnetic gradient in the primary plane of said card, covering said unit with a master record having means to magnetically mask selected ones of said spots in accordance with a data-representing code pattern, and exposing said unit through said master record to a distributed field of magnetic force perpendicular to the primary plane of said card capable of rendering the unmasked spots non-sensible.

5. The process of transferring statistical data-representations from a master record to a detail record, which comprises the following steps: preparing on the surface of a unit of card stock a complete matrix of discrete sensible spots capable of being rendered non-sensible by application thereto of a field of force, placing over said unit a master record comprising means for transmitting the field of force to selected ones of said spots while shielding the remaining ones of said spots, and applying a distributed field of said force through said master record to said detail record, the transmitting and masking means of said master record being arranged in a pattern representing coded data.

6. The process of transferring statistical data-representations from a master record to a detail record, which comprises the following steps: preparing on the surface of a unit of card stock a complete matrix of discrete sensible magnetized spots capable of being rendered non-sensible by application thereto of a unilateral field of magnetic force, placing over said unit a master record comprising means for transmitting the unilateral field of magnetic force to selected ones of said spots while shielding the remaining ones of said spots, and applying a distributed unilateral field of magnetic force through said master record to said detail record, the transmitting and masking means of said master record being arranged in a pattern representing coded data.

7. The process of transferring statistical data representations from a master record to a detail record, which comprises the following steps: preparing on the surface of a unit of card stock a complete matrix of discrete sensible spots magnetized in a direction parallel to the normal plane of said card and capable of being rendered non-sensible by application thereto of a field of magnetic force perpendicular to said plane, placing over said unit a master record comprising means for transmitting the field of force to selected ones of said spots while shielding the remaining ones of said spots, and applying a distributed field of said force through said master record and said detail record perpendicular to said plane, the transmitting and masking means of said master record being arranged in a pattern representing coded data.

8. The method of data processing comprising the steps of printing ordinary record cards with magnetic ink in a plurality of discrete spots, subjecting the discrete spots to lines of magnetic force parallel to the primary plane of the record card, applying lines of magnetic force perpendicularly to the plane of the record card to selected ones of said spots so as to manifest coded data therein; and magnetically sensing the remaining recorded spots so as to derive the data therefrom.

9. The method of data processing comprising the steps of printing ordinary record cards with magnetic ink in a plurality of discrete spots, subjecting the discrete spots to lines of magnetic force of alternating intensity, applying lines of unilateral magnetic force to selected ones of said spots so as to manifest coded data therein, and magnetically sensing the remaining recorded spots so as to derive the data therefrom.

10. The method of data processing comprising the steps of printing ordinary record cards with magnetic ink in a plurality of discrete square spots, the sides of which are parallel to the normal dimensions of said record cards, subjecting the discrete spots to lines of magnetic force of alternating intensity, lines of like intensity thereof being diagonal to the normal dimensions of the spots on the record cards, applying lines of unilateral magnetic force perpendicularly to the plane of the record card to selected ones of said spots so as to manifest coded data therein, and magnetically sensing the remaining recorded spots so as to derive the data therefrom.

11. The method of data processing comprising the steps of printing ordinary record cards with magnetic ink in a plurality of discrete spots, subjecting the discrete spots to lines of magnetic force of alternating intensity, lines of like intensity thereof being diagonal to the normal dimensions of the record cards, applying lines of unilateral magnetic force to selected ones of said spots so as to manifest coded data therein, and magnetically sensing the remaining recorded spots so as to derive the data therefrom.

12. The method of data processing comprising the steps of printing ordinary record card stock with magnetic ink in a plurality of discrete square spots, the sides of which are parallel to the normal dimensions of said card stock, severing the card stock into discrete record cards, subjecting the discrete spots to lines of magnetic force of alternating intensity, lines of like intensity thereof being diagonal to the normal dimensions of the spots on the record cards, applying lines of unilateral magnetic force perpendicularly to the plane of the record card to selected ones of said spots so as to manifest coded data therein, and magnetically sensing the remaining recorded spots so as to derive the data therefrom.

References Cited in the file of this patent

UNITED STATES PATENTS

| | | |
|---|---|---|
| 1,653,467 | O'Neill | Dec. 20, 1927 |
| 2,254,931 | Bryce | Sept. 2, 1941 |
| 2,484,642 | Paris | Oct. 11, 1949 |
| 2,496,047 | Goddard | Jan. 31, 1950 |
| 2,547,838 | Russell | Apr. 3, 1951 |
| 2,610,257 | Wissmann | Sept. 9, 1952 |
| 2,698,928 | Pulvari | Jan. 4, 1955 |
| 2,734,100 | Kendall | Feb. 7, 1956 |
| 2,779,540 | Hoeppner | Jan. 29, 1957 |
| 2,849,542 | MacChesney | Aug. 26, 1958 |
| 2,906,827 | Gordon et al. | Sept. 29, 1959 |